US010921462B2

(12) United States Patent
Miller et al.

(10) Patent No.: US 10,921,462 B2
(45) Date of Patent: Feb. 16, 2021

(54) INERTIAL NAVIGATION STABILIZATION VIA BAROMETER (71) Applicant: Apple Inc., Cupertino, CA (US)

(72) Inventors: Isaac T. Miller, Half Moon Bay, CA (US); Changlin Ma, San Jose, CA (US)

(73) Assignee: Apple Inc., Cupertino, CA (US)

(*) Notice: Subject to any disclaimer, the term of this patent is extended or adjusted under 35 U.S.C. 154(b) by 220 days.

(21) Appl. No.: 15/853,524

(22) Filed: Dec. 22, 2017

(65) Prior Publication Data
US 2019/0094387 A1 Mar. 28, 2019

Related U.S. Application Data (60) Provisional application No. 62/562,330, filed on Sep. 22, 2017.

(51) Int. Cl.
G01S 19/49 (2010.01)
G01C 21/20 (2006.01)
G01C 21/00 (2006.01)
G01C 21/16 (2006.01)
G01S 19/46 (2010.01)

(52) U.S. Cl.
CPC ............ *G01S 19/49* (2013.01); *G01C 21/005* (2013.01); *G01C 21/165* (2013.01); *G01C 21/20* (2013.01); *G01S 19/46* (2013.01)

(58) Field of Classification Search
CPC ....... G01S 19/49; G01S 19/46; G01C 21/005; G01C 21/165; G01C 21/265; G01C 21/3626; G01C 21/20
See application file for complete search history.

(56) References Cited

U.S. PATENT DOCUMENTS

| 6,522,298 | B1 | 2/2003 | Burgett et al. |
| 7,429,948 | B2 | 9/2008 | Burgett et al. |
| 8,188,912 | B1 | 5/2012 | Weisenburger |
| 8,566,032 | B2 | 10/2013 | Chowdhary et al. |
| 8,566,034 | B1 * | 10/2013 | Van Wyck Loomis ...... G01S 19/49 |
| | | | 701/480 |
| 9,651,387 | B2 | 5/2017 | Hunter et al. |

(Continued)

OTHER PUBLICATIONS

Chai et al., "2D/3D indoor navigation based on multi-sensor assisted pedestriab navigation in Wi-Fi environments," IEEE, 2012, 7 pages.

(Continued)

*Primary Examiner* — Frederick M Brushaber
(74) *Attorney, Agent, or Firm* — Morgan, Lewis & Bockius LLP (57) ABSTRACT A device implementing a system for estimating device location includes at least one processor configured to receive a first and second set of signals at a sampling interval, each set corresponding to location data. For each sampling period defined by the sampling interval, the at least one processor is configured to obtain first sensor data corresponding to device motion during the sampling period, obtain second sensor data corresponding to atmospheric pressure sampled at a beginning and end of the sampling period, calculate a change in altitude based on a difference in the atmospheric pressure at the beginning and end of the sampling period, and estimate a device state based on the first sensor data and change in altitude.

20 Claims, 5 Drawing Sheets (56) References Cited

U.S. PATENT DOCUMENTS

| | | | |
|---|---|---|---|
| 2003/0136191 A1* | 7/2003 | Tsuji | G01C 5/06 |
| | | | 73/384 |
| 2011/0077898 A1* | 3/2011 | Loomis | G01C 21/12 |
| | | | 702/141 |
| 2012/0239290 A1* | 9/2012 | Fujita | G01C 21/32 |
| | | | 701/430 |
| 2012/0330545 A1* | 12/2012 | Suzuki | G01C 21/165 |
| | | | 701/472 |
| 2016/0224750 A1* | 8/2016 | Kethman | G16H 40/63 |
| 2016/0320186 A1* | 11/2016 | Tanabe | G01C 5/06 |
| 2016/0334294 A1* | 11/2016 | Ueno | G01B 21/18 |
| 2017/0052028 A1 | 2/2017 | Choudhury et al. | |
| 2018/0043212 A1* | 2/2018 | Shirai | A63B 71/0622 |
| 2020/0189731 A1* | 6/2020 | Mistry | B64C 39/022 |

OTHER PUBLICATIONS

Bevermaier et al., "Barometric height estimation combined with map-matching in a loosely-coupled Kalman-filter," IEEE 7th Workshop on Positioning and Navigation Communication, Mar. 2010, pp. 128-134.

Zhang et al., "Performancr Investigation of Baromter Aided GPS/MEMS-IMU Integration," Navigation: Journal of the Institute of Navigation, Dec. 2012, pp. 598-604.

International Search Report and Written Opinion from PCT/US2018/045853, dated Nov. 12, 2018, 17 pages.

\* cited by examiner

INERTIAL NAVIGATION STABILIZATION VIA BAROMETER

CROSS-REFERENCE TO RELATED APPLICATIONS

The present application claims the benefit of U.S. Provisional Patent Application Ser. No. 62/562,330, entitled "INERTIAL NAVIGATION STABILIZATION VIA BAROMETER," filed Sep. 22, 2017, which is hereby incorporated herein by reference in its entirety and made part of the present U.S. Utility patent application for all purposes.

TECHNICAL FIELD

The present description relates generally to estimating the location of a device, including using a barometer of the device to estimate altitude for incorporating into an inertial navigation system.

BACKGROUND

An electronic device such as a laptop, tablet, smart phone or a wearable device may include a Global Navigation Satellite System (GNSS) receiver and one or more sensors (e.g., an accelerometer, a gyroscope) which can be used in conjunction with each other to estimate the location of the electronic device.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

The subject system provides for estimating the location of an electronic device. The subject system obtains signals corresponding to location data (e.g., via a GNSS receiver), and employs an inertial navigation system (INS) which uses sensors, such as an accelerometer, to continuously estimate device state (e.g., position, orientation and velocity) to supplement a location estimation determined from the signals corresponding to location data.

To improve the estimated location of the device, the subject system obtains sensor data corresponding to atmospheric pressure (e.g., using a barometer on the device). The subject system uses the atmospheric pressure data to calculate a change in altitude of the device over a given period of time, such as a sampling interval of the GNSS receiver. The change in altitude is used by the subject system to supplement the device state estimates that are based on the sensor data corresponding to the device motion. By supplementing a device state estimate with altitude change, it is possible to achieve a more accurate estimate of the device location.

Figure 1:
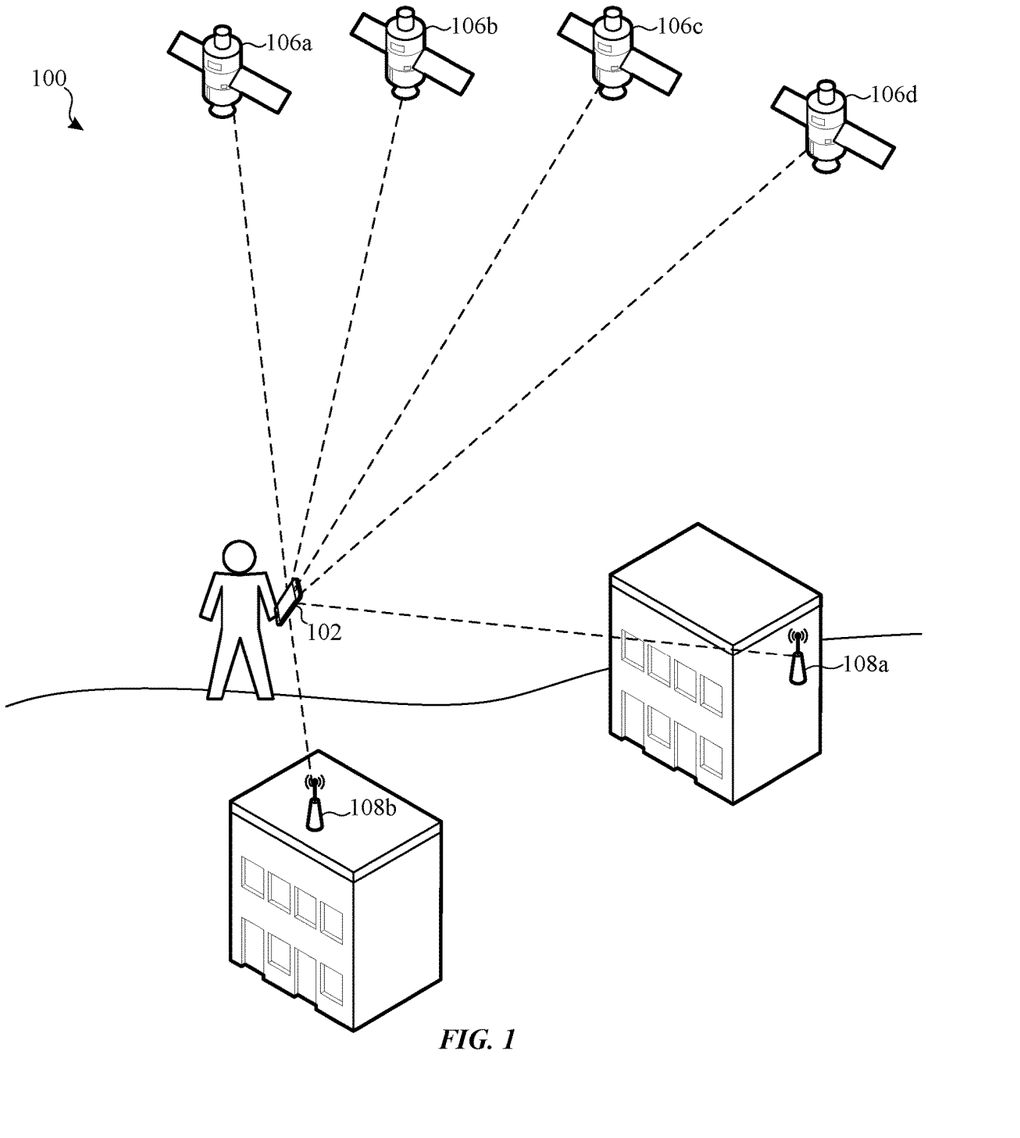
FIG. 1 illustrates an example environment in which an electronic device may implement the subject system in accordance with one or more implementations.

FIG. 1 illustrates an example environment 100 in which an electronic device may implement the subject system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102, GNSS satellites 106a, 106b, 106c and 106d (hereinafter "106a-106d") and wireless access points 108a-108b (e.g., Wi-Fi access points). For explanatory purposes, the environment 100 is illustrated in FIG. 1 as including the electronic device 102, the four GNSS satellites 106a-106d, and the two wireless access points 108a-108b; however, the environment 100 may include any number of electronic devices, any number of GNSS satellites, and any number of wireless access points. Other positioning technologies may be used independent of or in conjunction with GNSS and wireless access point technology to determine device location. Examples of such positioning technologies include, but are not limited to, cellular phone signal positioning, Bluetooth signal positioning and/or image recognition positioning.

The environment 100 may facilitate estimating the position of the electronic device 102. In one or more implementations, the electronic device 102 is carried by or otherwise coupled to a user, and/or the electronic device 102 may be coupled to and/or contained within a vehicle. In the example of FIG. 1, the user is traveling by foot. However, the user may be traveling, for example, within a vehicle (e.g., a land vehicle such as an automobile, a motorcycle, a bicycle, or a watercraft or an aircraft), through water, e.g. swimming, or by other means.

The environment 100 allows for the electronic device 102 to determine its location based on signals received from GNSS satellites 106a-106d. For example, the environment 100 allows the electronic device 102 to determine its location (e.g., longitude, latitude, and altitude/elevation) using signals transmitted along a line of sight by radio from GNSS satellites 106a-106d. Alternatively or in addition, the environment 100 allows the electronic device 102 to determine its location based on the strength of signals received from the wireless access points 108a-108b, which may have known locations (e.g., within a building or store, mounted on street posts, etc.).

The electronic device 102 may be, for example, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as GNSS radios, WLAN radios, cellular radios, Bluetooth radios, Zigbee radios, near field communication (NFC) radios, and/or other wireless radios. In FIG. 1, by way of example, the electronic device 102 is depicted as a smartphone. The electronic device 102 may be, and/or may include all or part of, the electronic device discussed below with respect to FIG. 2, and/or the electronic system discussed below with respect to FIG. 5.

Figure 2:
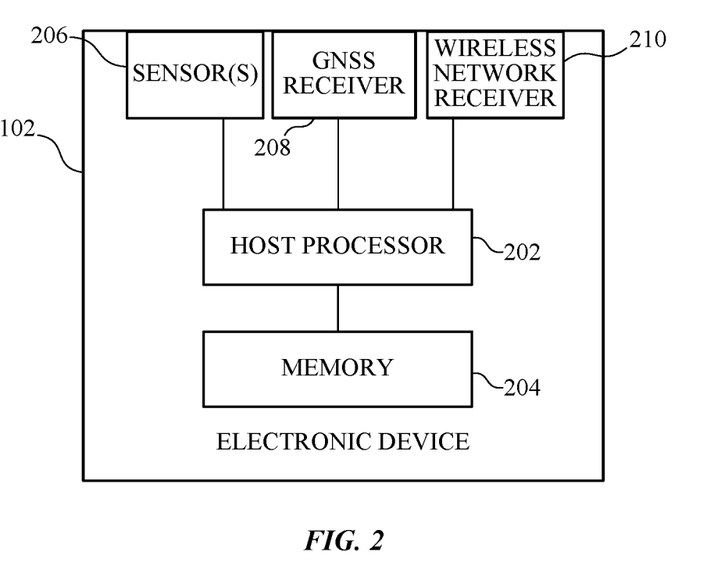
FIG. 2 illustrates an example electronic device that may implement the subject system in accordance with one or more implementations.

FIG. 2 illustrates an example electronic device that may implement the subject system in accordance with one or more implementations. While FIG. 2 refers to the electronic device 102 of FIG. 1, the electronic device in FIG. 2 is not limited to the electronic device of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a host processor 202, a memory 204, sensor(s) 206, a GNSS receiver 208 and wireless network receiver 210. The host processor 202 may include suitable logic, circuitry, and/or code that enable processing data and/or controlling operations of the electronic device 102. In this regard, the host processor 202 may be enabled to provide control signals to various other components of the electronic device 102. The host processor 202 may also control transfers of data between various portions of the electronic device 102. Additionally, the host processor 202 may implement an operating system or may otherwise execute code to manage operations of the electronic device 102. In the subject system, the host processor 202 may implement a software architecture for a location estimator that is discussed further below with respect to FIG. 3.

The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage. In one or more implementations, the memory 204 may store values for sensor signal measurements, GNSS receiver data, constraint data, device state estimates, and/or device location estimates, for example, based on motion of the electronic device 102.

Sensor(s) 206 may include one or more motion sensor(s), such as an accelerometer and/or a rate gyroscope. The motion sensor(s) may be used to facilitate movement and orientation related functions of the electronic device 102, for example, to detect movement, direction, and orientation of the device.

Alternatively or in addition, sensor(s) 206 may include one or more of a barometer, an electronic magnetometer, or generally any sensor that may be used to facilitate a positioning system. The barometer may be utilized to detect atmospheric pressure, which can be used in determining altitude of the electronic device 102. The electronic magnetometer (e.g., an integrated circuit chip) may provide data used to determine the direction of magnetic North, for example to be used as an electronic compass.

The GNSS receiver 208 may provide for geo-referencing. In one or more implementations, the GNSS receiver 208 may include an antenna for receiving GNSS signals from one or more positioning satellites (e.g., the GNSS satellites 106a-106d). For example, the GNSS receiver 208 may be compatible with one or more of Global Positioning System (GPS), Globalnaya Navigazionnaya Sputnikovaya Sistema (GLONASS), the Galileo positioning system, and/or generally any positioning system.

The wireless network receiver 210 may provide wireless connectivity for the electronic device 102. In one or more implementations, the wireless network receiver 210 may include an antenna for receiving wireless signals from wireless access points, wireless beacons, and/or other wireless devices. For example, the wireless network receiver 210 may be compatible with Wi-Fi or other types of wireless networking.

In one or more implementations, one or more of the host processor 202, the memory 204, the one or more sensor(s) 206, the GNSS receiver 208, the wireless network receiver 210, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
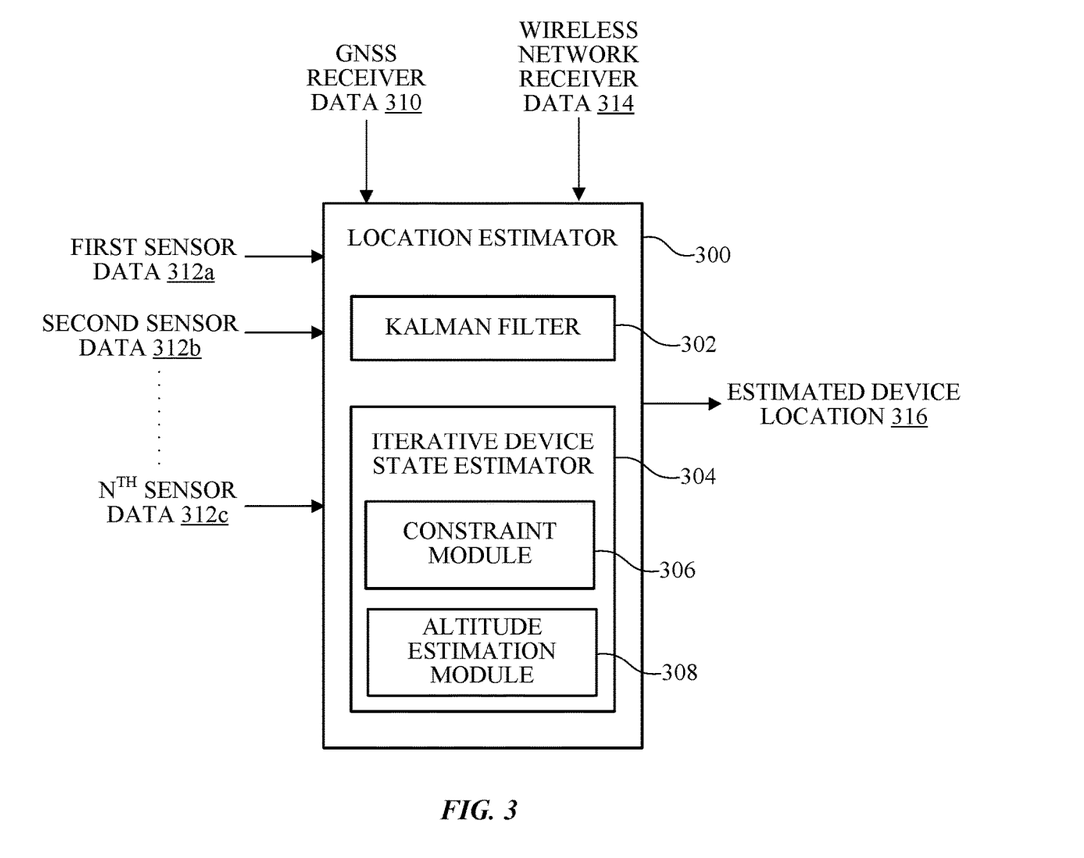
FIG. 3 illustrates an example of a location estimator of the subject system that may be implemented by an electronic device in accordance with one or more implementations.

FIG. 3 illustrates an example of a location estimator 300 of the subject system that may be implemented by an electronic device in accordance with one or more implementations. For example, the location estimator 300 can be implemented by one or more software modules running on the host processor 202 of the electronic device 102 of FIGS. 1-2. In another example, the location estimator 300 can be implemented by custom hardware (e.g., one or more coprocessors) configured to execute the functionality of the location estimator 300. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The location estimator 300 may include a Kalman filter 302 and an iterative device state estimator 304. The iterative device state estimator 304 may include a constraint module 306 and an altitude estimation module 308.

The location estimator 300 may receive sensor data (e.g., the first sensor data 312a, the second sensor data 312b, . . . , and the $N^{th}$ sensor data 312c, hereinafter "the sensor data 312a-312c"), GNSS receiver data 310 and/or wireless network receiver data 314 as input, and may provide an estimated device location 316 as output. In one or more implementations, the sensor data 312a-312c may be received from the sensor(s) 206, the GNSS receiver data 310 may be received from the GNSS receiver 208, and the wireless network receiver data 314 may be received from the wireless network receiver 210.

However, computing an accurate position solution (e.g., an estimated device location) in an environment (e.g., environment 100, which may include a GNSS positioning system) can be difficult in certain circumstances. For example, challenging signal environments (e.g., urban canyons, areas of dense foliage, areas near or within structures such as buildings, and/or other areas that may interfere with line of sight reception of signals) can make computing an accurate position solution difficult. In these environments, fewer signals are available, and those signals that are available tend to yield less accurate measurements on a device due to environmental attenuation.

To improve the availability and quality of position solutions in challenging signal environments, the location estimator 300 may employ the GNSS receiver data 310 (from the GNSS receiver 208) and/or the wireless network receiver data 314 (from the wireless network receiver 210) to determine an initial reference location for the electronic device 102. In one example, the initial reference location may be determined based on the strength of signals received by the electronic device 102 from Wi-Fi access points with known locations. In addition, the location estimator 300 may use the sensor data 312a-312c (from the sensor(s) 206) to supplement the initial reference location, thereby improving the position solution. For example, accelerometer measurements corresponding to acceleration of the electronic device 102, and/or gyroscope measurements corresponding to rotation rates of the electronic device 102, may be used to estimate device state (e.g., position, orientation and velocity) to supplement the initial reference location. In one or more implementations, the location estimator 300 employs an INS which uses the sensor data 312a-312c to continuously update a device state (e.g., position, orientation and velocity). The device states supplements a location estimation determined from the GNSS receiver data 310 and/or the wireless network receiver data 314.

The sampling interval of the GNSS receiver 208 may correspond to a frequency at which measurements are sampled (e.g., every 10 seconds). Thus, the sampling interval may define a sampling period (e.g., an epoch) during which sensor data (e.g., sensor data 312a-312c) may be obtained. Antenna motion (e.g., corresponding to motion resulting from movement of the electronic device 102), indicated by the sensor data 312a-312c over multiple epochs of measurements accumulates over time. Some types of antenna motion may be desirable, for example, where the electronic device 102 moves by virtue of the user traveling in a particular direction. However, other antenna motion may be undesirable. For example, shaking, swinging, or dropping of the electronic device 102 typically does not correspond to the travel direction of the user. Since antenna motion over multiple epochs of measurements accumulates over time, such undesirable antenna motion may degrade the position solution over time. Accordingly, in the subject system the location estimator 300 may subtract out undesirable antenna motion indicated by the sensor data 312a-312c between epochs of GNSS measurements corresponding to GNSS receiver data 310, to improve the location estimate.

In this regard, the location estimator 300 may implement a Kalman filter 302. The Kalman filter 302 corresponds to an algorithm that uses a series of measurements observed over time, containing statistical noise and other inaccuracies, and produces estimates of unknown variables that tend to be more accurate than those based on a single measurement alone. Thus, to improve the availability and quality of position solutions, measurements of GNSS receiver signals (e.g., the GNSS receiver data 310) may be used in the Kalman filter 302 with numerical integration of sensor measurements (e.g., the sensor data 312a-312c) to correct for undesirable antenna motion between epochs. In one or more implementations, the INS employed by the location estimator 300 performs such numerical integration.

Thus, the location estimator 300 may subtract out undesirable antenna motion between epochs, so that multiple epochs of GNSS measurements may be combined without being impacted by errors introduced by the undesirable antenna motion. In this regard, the constraint module 306 may introduce one or more motion constraints, corresponding to particular direction(s) in which motion typically does not occur or in which motion is limited. In doing so, the constraint module 306 may disregard or otherwise limit motion sensor measurements in the particular direction(s).

For example, the constraint module 306 of the iterative device state estimator 304 may introduce a vertical motion constraint, so as to disregard or otherwise limit motion sensor measurements in the vertical direction. In an environment in which the user of the electronic device 102 does not travel in the vertical direction (e.g., walking on a road or generally flat terrain), the vertical motion constraint may be beneficial in estimating the position solution. For example, the vertical motion constraint effectively removes a degree of freedom in the vertical direction that could otherwise have unstable estimates (e.g., due to numerical integration of sensor and device state estimation errors).

However, in other environments, the vertical motion constraint may degrade, rather than improve, the position solution. For example, in a case where the user is taking the stairs, riding an elevator or traversing terrain with steep slopes, the vertical motion constraint would suppress vertical motion associated with that such user movement. However, in these instances, the vertical motion of the user should be included in the position solution. As such, the vertical constraint may result in a less accurate position solution when the user's movement includes vertical motion that results in substantive altitude changes.

In another example, the user of the electronic device 102 may be within or otherwise coupled to a vehicle (e.g., an automobile or a plane) in motion. An INS may quickly become unstable in the vertical direction without some sort of vertical stabilization. For instance, a vertical constraint which assumes zero vertical motion may be applied. However, the barometer of the electronic device 102 may still be used to determine changes in device altitude.

Thus, the iterative device state estimator 304 may include the altitude estimation module 308. The altitude estimation module 308 provides for an estimate of altitude which can supplement the vertical direction as suppressed by the constraint module 306. For example, at least one of the sensor data 312a-312c may be atmospheric pressure data as sampled by a barometer of the electronic device 102. Atmospheric pressure is correlated to altitude. In particular, changes in atmospheric pressure yield measurements of change in device altitude, which can be used to supplement the suppressed vertical dimension. In one or more implementations, the state (e.g., position, velocity, attitude and/or the like) of the electronic device 102 may be updated with the delta-altitude measurements in the Kalman Filter 302, based on Equations 1-5 described below.

For example, Equation 1 corresponds to a linearized equation of motion for detecting device state, as follows:

$$x(k+1)=F^*x(k)+G^*v(k) \qquad \text{[Equation 1]}$$

In Equation 1, x(k+t) represents a state of the electronic device 102 at time k+1. For example, the state of the device may correspond to the position (e.g., a 3-dimensional position vector), a velocity (e.g., a 3-dimensional velocity vector), and/or an attitude (e.g., a 3-dimensional attitude vector) of the electronic device 102 at time k+1. Similarly, v(k+1) represents a vector of noise sources impacting device state. In some implementations, noise sources may include white noise and bias terms and/or the like affecting one or more of the sensors on the electronic device.

Moreover, F(k) may represent a known state or system matrix (e.g., derived from sensor measurements and kinematic and dynamic equations of device motion), and G(k) may represent a known input matrix (e.g., corresponding to sensor noise and also derived from sensor measurements and kinematic and dynamic equations of device motion). In some implementations, F(k) and G(k) are the state transition and noise input matrices, respectively, of the time-varying linear system derived by linearizing and then discretizing the equations of device motion. These equations, in turn, are a kinematic relationship between device position and velocity, a sum of accelerations that describe the change in device velocity over time, and a kinematic relationship between rate of change of device orientation and instantaneous device rotation.

As such, the state of the electronic device 102 at time k+1 (e.g., a next/current time period) is calculated from matrices F and G at time k (e.g., the previous time period). As described above however, the vertical direction for the state (e.g., position, velocity and/or attitude) may be suppressed, e.g., by via a vertical motion constraint applied by the constraint module 306.

To compensate for the vertical motion constraint, Equation 2 corresponds to detecting a change in device altitude based on barometer measurements:

$$z = \text{alt}(k+1) - \text{alt}(k) = H(k+1)*x(k+1) - H(k)*x(k) \quad \text{[Equation 2]}$$

In Equation 2, z represents the difference in altitude alt at time k and at time k+1. H represents a unit vector in the vertical direction, such that H multiplied by x corresponds to altitude alt.

Equations 3-5 are based on the relationships between the change in altitude z and the state of the electronic device 102 from Equations 1-2, as follows:

$$x(k) = \text{inv}(F)*(x(k+1) - G*v(k)) \quad \text{[Equation 3]}$$

$$z = H(k+1)*x(k+1) - H(k)*x(k) = H(k+1)*x(k+1) - H(k)*\text{inv}(F)*(x(k+1) - G*v(k)) \quad \text{[Equation 4]}$$

As can be seen from Equations 3-4, the state of the device at a particular time (e.g., time k+1) may be based on the sensor data corresponding to device motion from a prior time (e.g., time k), and on the altitude change of the device over the time period between k and k+1.

As such, a Kalman update (e.g., corresponding to the Kalman filter 302) may be used to calibrate the state of the electronic device 102 based on the change in altitude z. As noted above, the constraint module 306 provides for disregarding or limiting motion sensor measurements, e.g. accelerometer measurements, in the vertical direction. The altitude estimation module 308 supplements an estimation of the device state based on estimated changes in device altitude derived from barometer measurements. Moreover, the iterative device state estimator 304 may calibrate the device state (e.g., based on the Kalman updates, on a per-epoch basis), such that delta-altitude measurements are continuously updated over time. In this manner, it is possible to improve estimation of the device state. In turn, the improved estimation of the device state may improve the estimation of device location.

In one or more implementations, the location estimator 300, including the Kalman filter 302 and the iterative device state estimator 304 (which includes the constraint module 306 and the altitude estimation module 308), are implemented as software instructions, stored in the memory 204, which when executed by the host processor 202, cause the host processor 202 to perform particular function(s).

In one or more implementations, one or more of the location estimator 300, the Kalman filter 302, the iterative device state estimator 304, the constraint module 306, and/or the altitude estimation module 308 may be implemented in software (e.g., subroutines and code) and/or hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

Figure 4:
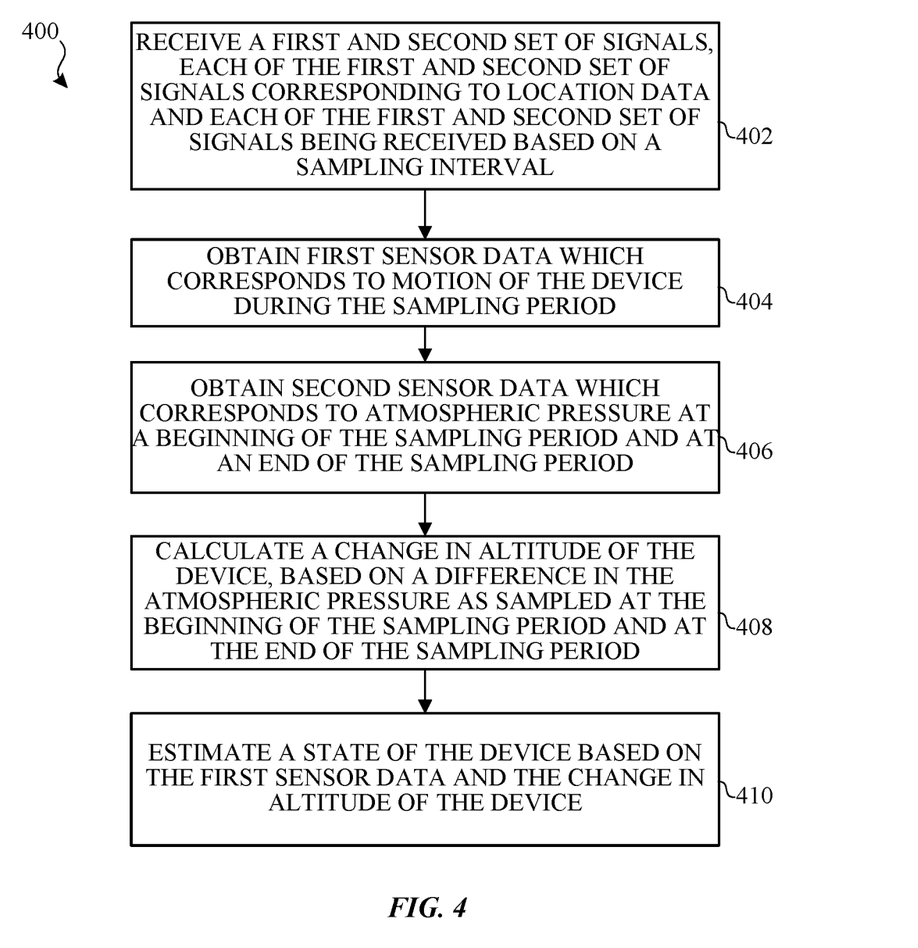
FIG. 4 illustrates a flow diagram of an example process for estimating the location of an electronic device in accordance with one or more implementations.

FIG. 4 illustrates a flow diagram of an example process for estimating the location of an electronic device in accordance with one or more implementations. For explanatory purposes, the process 400 is primarily described herein with reference to the electronic device 102 of FIGS. 1-2. However, the process 400 is not limited to the electronic device 102, and one or more blocks (or operations) of the process 400 may be performed by one or more other components of the electronic device 102. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The electronic device 102 receives a first and second set of signals, each of the first and second set of signals corresponding to location data and each of the first and second set of signals being received based on a sampling interval (402). For example, the electronic device 102 may receive first and second sets of GNSS signals from the satellites 106a-d, at the sampling interval.

For each sampling period defined by the sampling interval, the electronic device 102 obtains first sensor data which corresponds to motion of the device during the sampling period (404). For example, the electronic device 102 may obtain the first sensor data across each sampling period. The first sensor data may be obtained by an accelerometer, a gyroscope or a magnetometer of the electronic device 102. In addition, the electronic device 102 obtains second sensor data which corresponds to atmospheric pressure at a beginning of the sampling period and at an end of the sampling period (406). The second sensor data may be received by a barometer of the device.

For each sampling period defined by the sampling interval, the electronic device 102 calculates a change in altitude of the device, based on a difference in the atmospheric pressure as sampled at the beginning of the sampling period and at the end of the sampling period (408).

In one or more implementations, the electronic device 102 does not necessarily calculate a change in altitude at each sampling period (e.g., for each epoch corresponding to sets of location data signals). For example, if barometric pressure errors are detected in the sensor data, it may be advantageous to skip barometer updates at some epochs. The electronic device 102 may resume updates when barometer data is detected to be well-behaved (e.g., when the barometric pressure errors are no longer detected by the electronic device 102 in the sensor data).

For each sampling period defined by the sampling interval, the electronic device 102 estimates a state of the device based on the first sensor data and the change in altitude of the device (410). In particular, estimating the state may be based on a vertical motion constraint which disregards or limits motion sensor measurements corresponding to a vertical direction for the respective first sensor data. Further, estimating the state of the device may be based on a Kalman filter, which applies a linearized equation of motion in association with the first sensor data, and which integrates the change in altitude with the linearized equation of motion, to account for vertical motion (which is suppressed in the first sensor date by the vertical motion constraint).

Estimating the state of the device for a particular time may be based on the respective first sensor data for a sampling period prior to the particular time, and on the respective change in altitude of the device for the sampling period prior to the particular time. The electronic device 102 may estimate a location of the device based on the estimated state of the device and on a subsequent set of signals, corresponding to location data (e.g., GNSS signals), received by the device. For example, as GNSS received data 310 is received, the estimated device states may be used to supplement the location estimates derived from the received GNSS received data 310. In this regard, the state of the device may be estimated using an inertial navigation system, the inertial navigation system supplementing a location estimation determined from the plural sets of signals.

Figure 5:
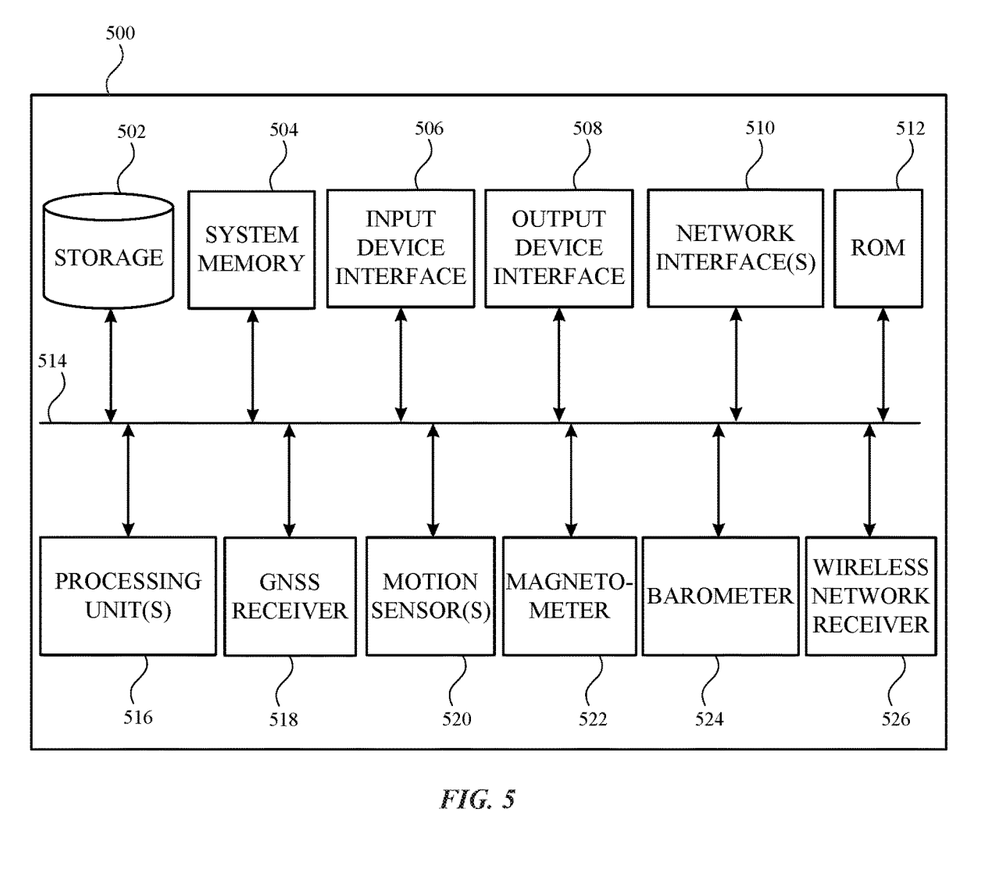
FIG. 5 illustrates an example electronic system with which aspects of the subject technology may be implemented in accordance with one or more implementations.

FIG. 5 illustrates an electronic system 500 with which one or more implementations of the subject technology may be implemented. The electronic system 500 can be, and/or can be a part of, any electronic device for generating the features and processes described in reference to FIGS. 1-4, including but not limited to a laptop computer, tablet computer, smart phone, and wearable device (e.g., smart watch, fitness band). The electronic system 500 may include various types of computer readable media and interfaces for various other types of computer readable media. The electronic system 500 includes a bus 514, one or more processing unit(s) 516, a system memory 504 (and/or buffer), a ROM 512, a permanent storage device 502, an input device interface 506, an output device interface 508, and one or more network interface(s) 510, or subsets and variations thereof.

The bus 514 collectively represents all system, peripheral, and chipset buses that communicatively connect the numerous internal devices of the electronic system 500. In one or more implementations, the bus 514 communicatively connects the one or more processing unit(s) 516 with the ROM 512, the system memory 504, and the permanent storage device 502. From these various memory units, the one or more processing unit(s) 516 retrieves instructions to execute and data to process in order to execute the processes of the subject disclosure. The one or more processing unit(s) 516 can be a single processor or a multi-core processor in different implementations.

The ROM 512 stores static data and instructions that are needed by the one or more processing unit(s) 516 and other modules of the electronic system 500. The permanent storage device 502, on the other hand, may be a read-and-write memory device. The permanent storage device 502 may be a non-volatile memory unit that stores instructions and data even when the electronic system 500 is off. In one or more implementations, a mass-storage device (such as a magnetic or optical disk and its corresponding disk drive) may be used as the permanent storage device 502.

In one or more implementations, a removable storage device (such as a floppy disk, flash drive, and its corresponding disk drive) may be used as the permanent storage device 502. Like the permanent storage device 502, the system memory 504 may be a read-and-write memory device. However, unlike the permanent storage device 502, the system memory 504 may be a volatile read-and-write memory, such as random access memory. The system memory 504 may store any of the instructions and data that one or more processing unit(s) 516 may need at runtime. In one or more implementations, the processes of the subject disclosure are stored in the system memory 504, the permanent storage device 502, and/or the ROM 512. From these various memory units, the one or more processing unit(s) 516 retrieves instructions to execute and data to process in order to execute the processes of one or more implementations.

The bus 514 also connects to the input and output device interfaces 506 and 508. The input device interface 506 enables a user to communicate information and select commands to the electronic system 500. Input devices that may be used with the input device interface 506 may include, for example, alphanumeric keyboards and pointing devices (also called "cursor control devices"). The output device interface 508 may enable, for example, the display of images generated by electronic system 500. Output devices that may be used with the output device interface 508 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information.

One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

The bus also connects to a GNSS receiver 518, a motion sensor(s) 520, an electronic magnetometer 522, a barometer 524 and a wireless network receiver 526, to facilitate multiple functionalities. In one or more implementations, the motion sensor(s) 520 may facilitate orientation functions of the device. For example, the motion sensor(s) 520 (e.g., an accelerometer and/or a rate gyroscope) may be utilized to detect movement, travel and orientation of the electronic system 500. The barometer 524 may be utilized to detect atmospheric pressure, which can be used in determining altitude for the electronic system 500.

The GNSS receiver 518 may provide for geo-referencing. The wireless network receiver 526 may provide for receiving signals from wireless access points. The electronic magnetometer 522 (e.g., an integrated circuit chip) may provide data used to determine the direction of magnetic North. Thus, the electronic magnetometer 522 may be used as an electronic compass.

Finally, as shown in FIG. 5, the bus 514 also couples the electronic system 500 to one or more networks and/or to one or more network nodes through the one or more network interface(s) 510. In this manner, the electronic system 500 can be a part of a network of computers (such as a LAN, a wide area network ("WAN"), or an Intranet, or a network of networks, such as the Internet. Any or all components of the electronic system 500 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
   receiving, by a device, a first and second set of signals, each of the first and second set of signals corresponding to location data and each of the first and second set of signals being received based on a sampling interval; and
   for each sampling period of several sampling periods defined by the sampling interval and occurring after receiving the first and second set of signals,
      obtaining first sensor data which corresponds to motion of the device during the sampling period,
      obtaining second sensor data which corresponds to atmospheric pressure at a beginning of the sampling period and at an end of the sampling period,
      calculating a change in altitude of the device, based on a difference in the atmospheric pressure as sampled at the beginning of the sampling period and at the end of the sampling period, and
      estimating a state of the device based on the first sensor data and the change in altitude of the device and independent of location data corresponding to the first and second set of signals during the sampling period.

2. The method of claim 1, further comprising:
   estimating a location of the device based on the estimated state of the device and on a third set of signals, corresponding to location data, subsequently received by the device.

3. The method of claim 1, wherein estimating the state of the device is based on a vertical motion constraint which disregards or limits sensor measurements corresponding to a vertical direction for the respective first sensor data.

4. The method of claim 3, wherein estimating the state of the device is based on a Kalman filter, which applies a linearized equation of motion in association with the first sensor data, and which integrates the change in altitude with the linearized equation of motion, to account for the vertical motion constraint.

5. The method of claim 1, wherein estimating the state of the device for a particular time is based on the respective first sensor data for a sampling period prior to the particular time, and on the respective change in altitude of the device for the sampling period prior to the particular time.

6. The method of claim 1, wherein the first sensor data is obtained by an accelerometer, a gyroscope or a magnetometer of the device.

7. The method of claim 1, wherein the second sensor data is obtained by a barometer of the device.

8. The method of claim 1, wherein the state of the device prior to the several sampling periods is estimated using an inertial navigation system, the inertial navigation system supplementing a location estimation determined from the first and second sets of signals.

9. A device, comprising:
   a wireless receiver;
   plural sensors; and
   at least one processor configured to:
      receive, by the wireless receiver, a first and second set of signals, each of the first and second set of signals corresponding to location data and each of the first and second set of signals being received based on a sampling interval; and
      for each sampling period of several sampling periods defined by the sampling interval and occurring after receiving the first and second set of signals,
         obtain, by a first sensor of the plural sensors, first sensor data which corresponds to motion of the device during the sampling period
         obtain, by a second sensor of the plural sensors, second sensor data which corresponds to atmospheric pressure at a beginning of the sampling period and at an end of the sampling period,
         calculate a change in altitude of the device, based on a difference in the atmospheric pressure as sampled at the beginning of the sampling period and at the end of the sampling period, and
         estimate a state of the device based on the first sensor data and the change in altitude of the device and independent of location data corresponding to the first and second set of signals during the sampling period.

10. The device of claim 9, wherein estimating the state of the device is based on a vertical motion constraint which disregards or limits sensor measurements corresponding to a vertical direction for the respective first sensor data.

11. The device of claim 10, wherein estimating the state of the device is based on a Kalman filter, which applies a linearized equation of motion in association with the first sensor data, and which integrates the change in altitude with the linearized equation of motion, to account for the vertical motion constraint.

12. The device of claim 9, wherein estimating the state of the device for a particular time is based on the respective first sensor data for a time period prior to the particular time, and on the respective change in altitude of the device for the time period prior to the particular time.

13. The device of claim 9, wherein the first sensor is an accelerometer, a gyroscope or a magnetometer.

14. The device of claim 9, wherein the second sensor data is a barometer.

15. The device of claim 9, wherein the state of the device prior to the several sampling periods is estimated using an inertial navigation system, the inertial navigation system supplementing a location estimation determined from the first and second sets of signals.

16. A computer program product comprising code stored in a non-transitory computer-readable storage medium, the code comprising:
    code to receive, by a device, a first and second set of signals, each of the first and second set of signals corresponding to location data and each of the first and second set of signals being received based on a sampling interval; and
    code to, for each sampling period defined by the sampling interval,
        obtain first sensor data which corresponds to motion of the device during the sampling period,
        obtain second sensor data which corresponds to atmospheric pressure at a beginning of the sampling period and at an end of the sampling period,
        calculate a change in altitude of the device, based on a difference in the atmospheric pressure as sampled at the beginning of the sampling period and at the end of the sampling period, and
        estimate a state of the device based on the first sensor data and the change in altitude of the device, independent of the location data corresponding to the first and second set of signals, and based on a vertical motion constraint which disregards or limits sensor measurements corresponding to a vertical direction for the first sensor data.

17. The computer program product of claim 16, wherein estimating the state of the device is based on a Kalman filter, which applies a linearized equation of motion in association with the first sensor data, and which integrates the change in altitude with the linearized equation of motion, to account for the vertical motion constraint.

18. The computer program product of claim 16, wherein estimating the state of the device for a particular time is based on the respective first sensor data for a sampling period prior to the particular time, and on the respective change in altitude of the device for the sampling period prior to the particular time.

19. The computer program product of claim 16, wherein the first sensor data is obtained by an accelerometer, a gyroscope or a magnetometer of the device.

20. The computer program product of claim 16, wherein the second sensor data is obtained by a barometer of the device.

* * * * *